United States Patent
Yamagishi

(10) Patent No.: US 11,068,133 B2
(45) Date of Patent: *Jul. 20, 2021

(54) ELECTRONIC ALBUM APPARATUS AND METHOD OF CONTROLLING OPERATION OF SAME

(71) Applicant: FUJIFILM Corporation, Tokyo (JP)

(72) Inventor: Hideki Yamagishi, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,913

(22) Filed: Jan. 2, 2020

(65) Prior Publication Data

US 2020/0142555 A1 May 7, 2020

Related U.S. Application Data

(60) Division of application No. 14/826,465, filed on Aug. 14, 2015, now Pat. No. 10,552,006, which is a (Continued)

(30) Foreign Application Priority Data

Mar. 11, 2013 (JP) ................................. 2013-047553

(51) Int. Cl.
*G06F 3/0483* (2013.01)
*G06F 3/0481* (2013.01)
*G06T 11/60* (2006.01)

(52) U.S. Cl.
CPC ........ *G06F 3/0483* (2013.01); *G06F 3/04817* (2013.01); *G06T 11/60* (2013.01)

(58) Field of Classification Search
CPC ..... G06F 3/0483; G06F 3/04817; G06T 11/60
See application file for complete search history.

(56) References Cited

U.S. PATENT DOCUMENTS 7,868,924 B2 1/2011 Matsushita et al.
8,086,612 B2 12/2011 Matsushita et al.
(Continued)

FOREIGN PATENT DOCUMENTS

CN 101142818 3/2008
JP 2002-049907 2/2002
(Continued)

OTHER PUBLICATIONS

International Search Report, PCT/JP2014/053972, dated Apr. 28, 2014.
(Continued)

*Primary Examiner* — Jennifer N To
*Assistant Examiner* — Amy P Hoang
(74) *Attorney, Agent, or Firm* — Nixon & Vanderhye

(57) ABSTRACT

An electronic album is created taking into consideration the intentions of the user regarding electronic album creation. Face images are extracted from among a number of images for an electronic album and the face images are displayed on a display screen. A face image of an important person is dragged and dropped onto an important image setting area, and the face image of a person not required to be included in the electronic album is dragged and dropped onto an excluded image setting area. An electronic album in line with user intentions is created so as to increase the proportion of images of an important person and exclude images of unwanted persons.

19 Claims, 14 Drawing Sheets

Related U.S. Application Data continuation of application No. PCT/JP2014/053972, filed on Feb. 20, 2014.

(56) References Cited

U.S. PATENT DOCUMENTS

| | | | |
|---|---|---|---|
| 8,260,827 B2 | 9/2012 | Matsushita et al. | |
| 8,345,118 B2 | 1/2013 | Matsushita et al. | |
| 8,423,559 B2 | 4/2013 | Matsushita et al. | |
| 8,856,149 B2 | 10/2014 | Matsushita et al. | |
| 2002/0122067 A1 | 9/2002 | Geigel | |
| 2003/0117651 A1* | 6/2003 | Matraszek | G06F 16/58 358/1.18 |
| 2004/0201752 A1* | 10/2004 | Parulski | H04N 1/00188 348/231.99 |
| 2006/0221779 A1 | 10/2006 | Matsushita et al. | |
| 2007/0288453 A1 | 12/2007 | Podilchuk | |
| 2008/0062283 A1 | 3/2008 | Matsushita et al. | |
| 2008/0298766 A1* | 12/2008 | Wen | G06F 16/5854 386/282 |
| 2008/0304808 A1 | 12/2008 | Newell | |
| 2009/0089712 A1 | 4/2009 | Sato | |
| 2010/0238191 A1 | 9/2010 | Lee | |
| 2011/0211736 A1* | 9/2011 | Krupka | G06K 9/00677 382/118 |
| 2011/0305373 A1 | 12/2011 | Matsushita et al. | |
| 2012/0008873 A1 | 1/2012 | Matsushita et al. | |
| 2012/0106859 A1* | 5/2012 | Cheatle | G11B 27/28 382/225 |
| 2012/0189214 A1 | 7/2012 | Matsushita et al. | |
| 2012/0265334 A1 | 10/2012 | Brookhart | |
| 2013/0050747 A1 | 2/2013 | Cok | |
| 2014/0010465 A1 | 1/2014 | Mochizuki | |

FOREIGN PATENT DOCUMENTS

| | | |
|---|---|---|
| JP | 2006-079457 | 3/2006 |
| JP | 2006-236267 | 9/2006 |
| JP | 2006-293985 | 10/2006 |
| JP | 2006-295889 | 10/2006 |
| JP | 2007-179198 | 7/2007 |
| JP | 2010-057073 | 3/2010 |
| JP | 2012-009072 | 1/2012 |

OTHER PUBLICATIONS

Written Opinion—PCT/JP2014/053972—dated Apr. 28, 2014.
Japanese Office Action dated Nov. 17, 2015, Application No. 2013-047553.
Chinese Office Action dated Nov. 30, 2016 in corresponding Chinese Patent Application No. 201480005051.1 with English translation of Chinese Office Action.
Chinese Office Action with regard to corresponding Chinese Patent Application No. 201480005051.1 with English translation of Chinese Office Action.
Chinese Office Action issued in Application No. 2014800050511, dated Mar. 5, 2018.

* cited by examiner

ELECTRONIC ALBUM APPARATUS AND METHOD OF CONTROLLING OPERATION OF SAME

CROSS-REFERENCE TO RELATED APPLICATIONS

This application is a Continuation of PCT International Application No. PCT JP2014/053972 filed on Feb. 20, 2014, which claims priority under 35 U.S.C. § 119(a) to Japanese Patent Application No. 2013-047553 filed Mar. 11, 2013. Each of the above application(s) is hereby expressly incorporated by reference, in its entirety, into the present application.

BACKGROUND OF THE INVENTION

Field of the Invention

This invention relates to an electronic album apparatus as well as a method and recording medium storing a program for controlling the operation thereof.

Description of the Related Art

Electronic albums available in the art are adapted so that a number of images captured as by a digital camera can be enjoyed in a manner similar to that of a paper photograph album. In order to achieve this, there is a system in which a number of images are assigned to each page constituting the electronic album, thereby creating the electronic album (Patent Document 1). Further, there is a system adapted to generate classification information for classifying multiple image files and use the generated classification information to control the display of multiple image files (Patent Document 2).

Patent Document 1: Japanese Patent Application Laid Open No. 2012-9072

Patent Document 2: Japanese Patent Application Laid Open No. 2002-49907

According to both Patent Documents 1 and 2, however, an electronic album is created without taking into consideration the intentions of the user when it comes to electronic album creation. The user needs to correct the electronic album.

SUMMARY OF THE INVENTION

An object of the present invention is to create an electronic album taking into consideration the intentions of the user regarding electronic album creation.

An electronic album apparatus according to the present invention includes: a reading device (reading means) for reading a number of images for electronic album creation; an electronic album image display control device (electronic album image display control means) for controlling a display device so as to display on a display screen at least some of the images for electronic album creation read by the reading device; an important image setting device (important image setting means) responsive to a designation from a user for setting important images from among the images being displayed on the display screen under the control of the electronic-album image display control device; and an electronic album display control device (electronic album display control means) for controlling the display device so as to display on the display screen an electronic album created using the number of images for electronic album creation in such a manner that a proportion of important images, which have been set by the important image setting device, included in the electronic album is larger than a proportion of included images other than the important images.

The present invention also provides an operation control method suited to the above-described electronic album apparatus. Specifically, the present invention provides a method of controlling operation of an electronic album apparatus, comprising steps of: reading a number of images for electronic album creation; controlling a display device so as to display on a display screen at least some of the read images for electronic album creation; in response to a designation from a user, setting important images from among the images being displayed on the display screen; and controlling the display device so as to display on the display screen an electronic album created using the number of images for electronic album creation in such a manner that a proportion of important images, which have been set, included in the electronic album is larger than a proportion of included images other than the important images.

The present invention further provides a recording medium storing a program for controlling a computer of an electronic album apparatus. It may also be arranged to provide such a program.

In accordance with the present invention, a number of images for creating an electronic album are read and at least some of these read images are displayed on a display screen. Important images are designated by the user from among the number of displayed images. By using the number of images for electronic album creation, an electronic album is created in such a manner that the proportion of designated important images will exceed the proportion of images other than the important images. The electronic album thus created will be displayed on the display screen. Although the electronic album will contain the important images designated by the user and the images other than the important images, the proportion of important images designated by the user will be greater. As a result, an electronic album in line with the user's intentions will be obtained.

By way of example, the electronic album display control device controls the display device so as to display on the display screen an electronic album created in such a manner that a proportion of images, which are included in the electronic album, considered identical with the important images set by the important image setting device is larger than a proportion of included images other than the images considered identical with the important images.

The apparatus may further include an excluded image setting device (excluded image setting means) responsive to a designation from the user for setting excluded images from among the images being displayed on the display screen under control of the electronic album image display control device. In this case, the electronic album display device would, by way of example, control the display device so as to display on the display screen an electronic album that has been created so as to exclude the excluded images set by the excluded image setting device.

The apparatus may include: a page image display control device (page image display control means) for controlling the display device so as to display on the display screen the important images set by the important-image setting device and a page image that constitutes the electronic album and, moreover, includes image display frames that define image display positions; and a layout image display control device (layout image display control means) for controlling the display screen so as to display an important image, which has been designated by the user from among the important images being displayed under the control of the electronic album image display control device, in a prescribed image display frame designated by the user. In this case, the electronic album display control device would, by way of example, control the display device so as to display on the display screen an electronic album created in such a manner that images related to the important image designated by the user are displayed in image display frames nearby the prescribed image display frame designated by the user.

The apparatus may further include a theme setting device (theme setting means) for setting a theme of the electronic album. In this case, the electronic album image display control device would, by way of example, control the display device so as to display on the display screen images for electronic album creation that match the theme set by the theme setting device.

The theme setting device is capable of setting a person whose images have been captured, an event where images have been captured, a location where images have been captured or image-capture date and time as a theme of the electronic album.

The apparatus may further include at least one of a creation device (creation means) for creating an electronic album, using the images for electronic album creation, in such a manner that a proportion of important images, which have been set by the important image setting device, included in the electronic album is larger than a proportion of included images other than the important images, or a communication unit for sending data, which represents the images for electronic album creation read by the reading device, to an album layout unit, and receiving an electronic album transmitted from the album layout unit, the electronic album having been created in the album layout unit in such a manner that a proportion of important images, which have been set by the important image setting device, included in the electronic album is larger than a proportion of included images other than the important images. In this case, the electronic album display control device would control the display device so as to display on the display screen the electronic album created by the creation device or the electronic album received by the communication unit.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

FIGS. 1 to 11 are functional block diagrams of an electronic album apparatus according to an embodiment of the present invention.

Figure 1:
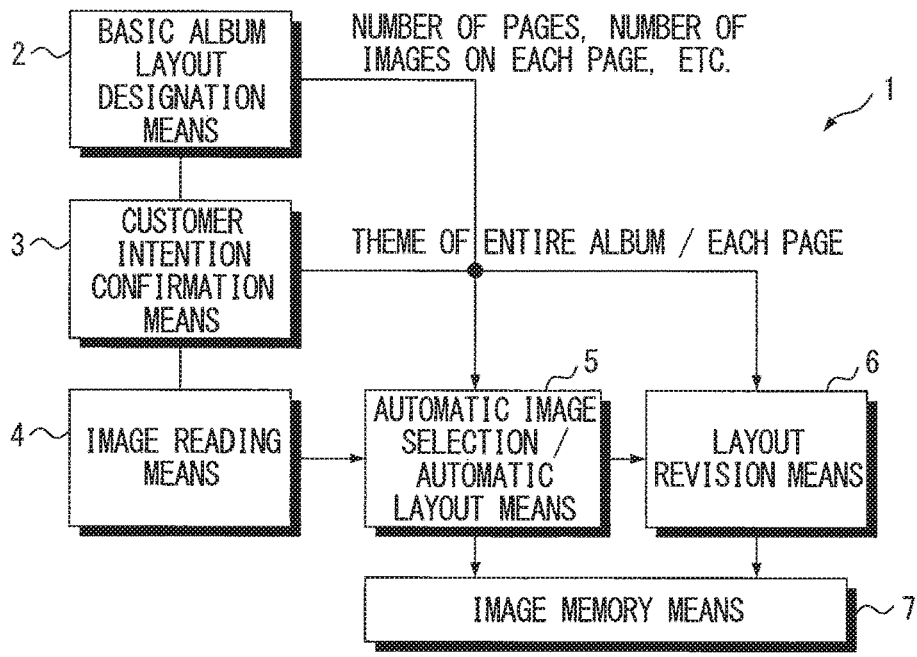
FIGS. 1 to 8 are functional block diagrams each illustrating an electronic album apparatus.

With reference to FIG. 1, as electronic album apparatus 1 includes image reading means 4. A number of image files for electronic album creation, which have been stored on a recording medium such as a memory card carried by the user, are read by the image reading means 4. The intentions of the user, such as the overall theme of the electronic album and the theme of each page of the album, are checked by customer intention confirmation means 3. Using basic album layout designation means 2, the user designates the basic layout of the electronic album, such as the number of pages and number of images on each page. Further, using a number of images represented by the image files read by the image reading means 4, automatic image selection/automatic layout means 5 ("/" means "and" in this specification) generates an electronic album having the number of pages, etc., designated in the basic album layout designation means 2 as well as the overall theme, etc., confirmed by the customer intention confirmation means 3. The electronic album generated is revised by layout revision means 6 and is then stored in image memory means 7.

Figure 2:
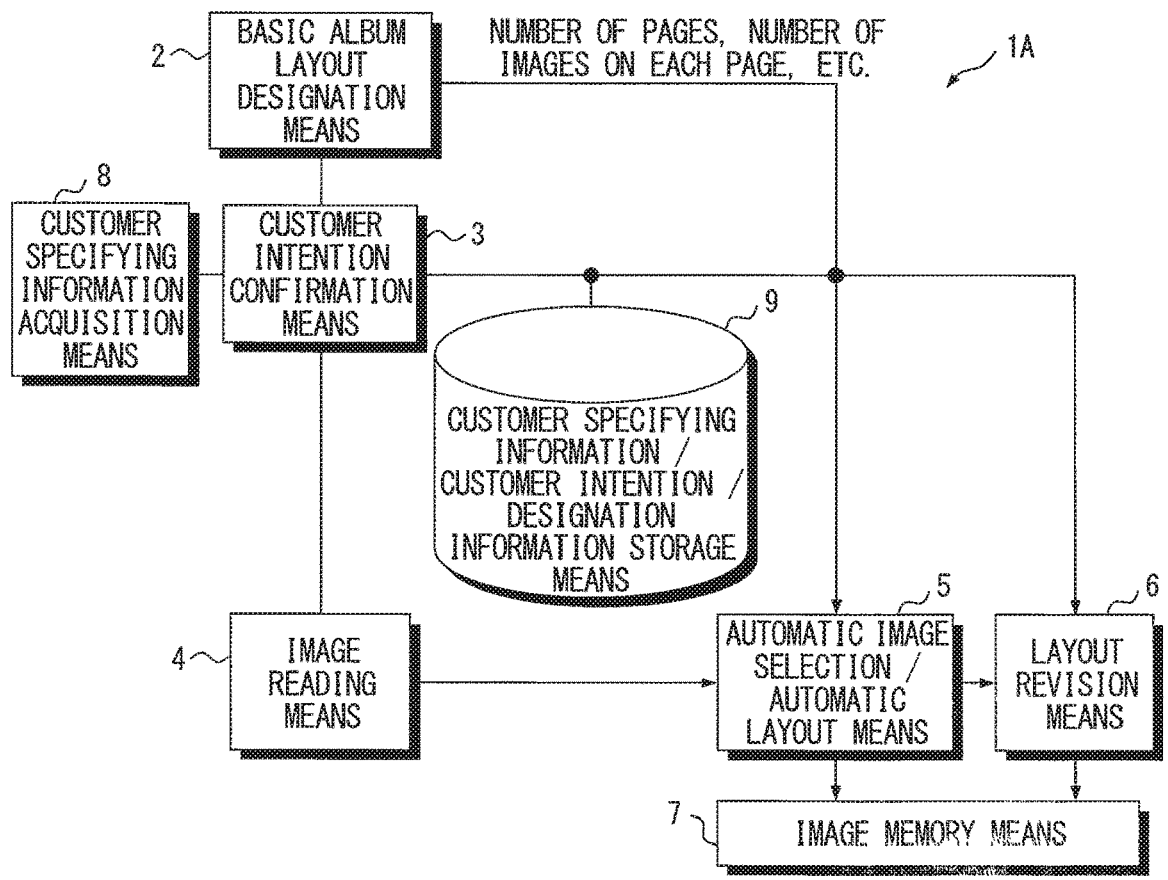

FIG. 2 is a functional block diagram of an electronic album apparatus 1A having other functions. Components in FIG. 2 identical with those shown in FIG. 1 are designated by like reference characters and need not be described again.

The electronic album apparatus 1A includes customer specifying information acquisition means 8 and customer specifying information/customer intention/designation information storage means 9. Information specifying the user is acquired by the customer specifying information acquisition means 8, and user intentions obtained in the customer intention confirmation means 3 are stored in the customer specifying information/customer intention/designation information storage means 9.

Figure 3:
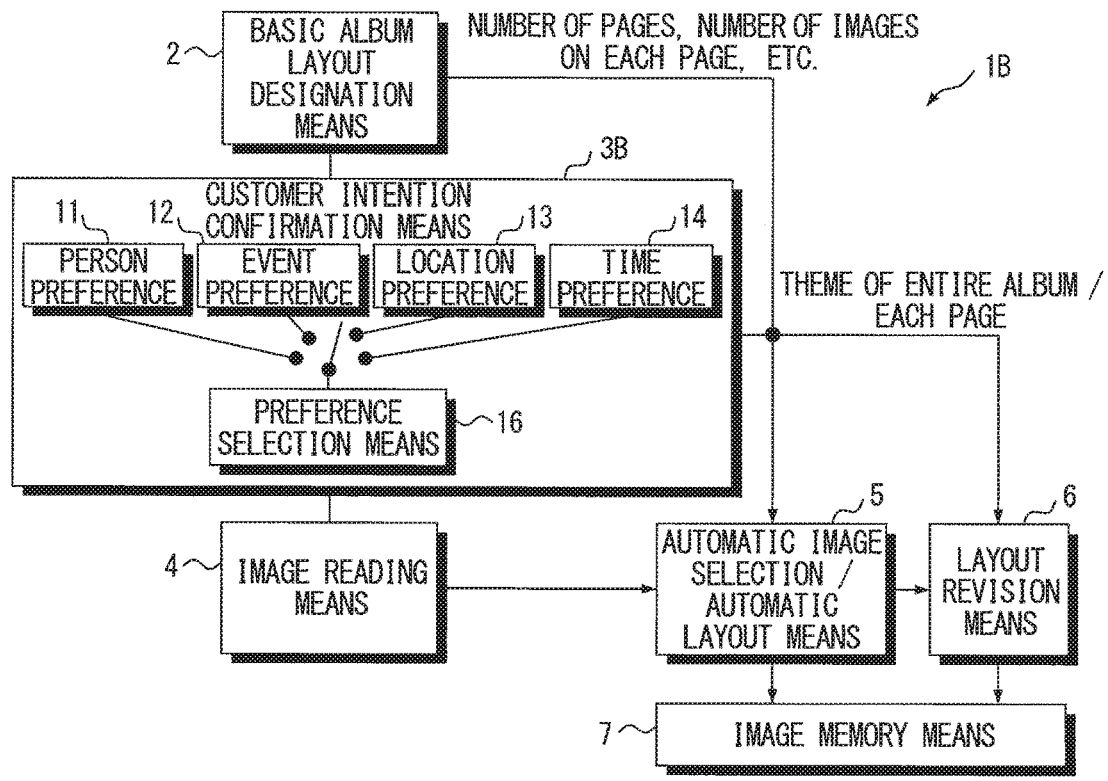

FIG. 3 is a functional block diagram of an electronic album apparatus 1B. Components in FIG. 3 identical with those shown in drawings such as FIG. 1 are designated by like reference characters and need not be described again.

The electronic album apparatus 1B includes customer intention confirmation means 3B corresponding to the customer intention confirmation means 3 described above. The customer intention confirmation means 3B includes person preference setting means 11, event preference setting means 12, location preference setting means 13 and time preference setting means 14. In a case where the user intends to create an electronic album about a preferred person, in which a specific person is to be adopted as the theme, the person preference setting means 11 is set. In a case where the user intends to create an electronic album in which a specific event is to be adopted as the theme, the event preference setting means 12 is set. In a case where the user intends to create an electronic album in which the location of image capture is to be adopted as the theme, the location preference setting means 13 is set. In a case where the user intends to create an electronic album in which the time of image capture is to be adopted as the theme, the time preference setting means 14 is set. Themes set by these setting means 11 to 14 are selected in preference selection means 16 via switching means 15. An electronic album is generated in accordance with the selected theme.

Figure 4:
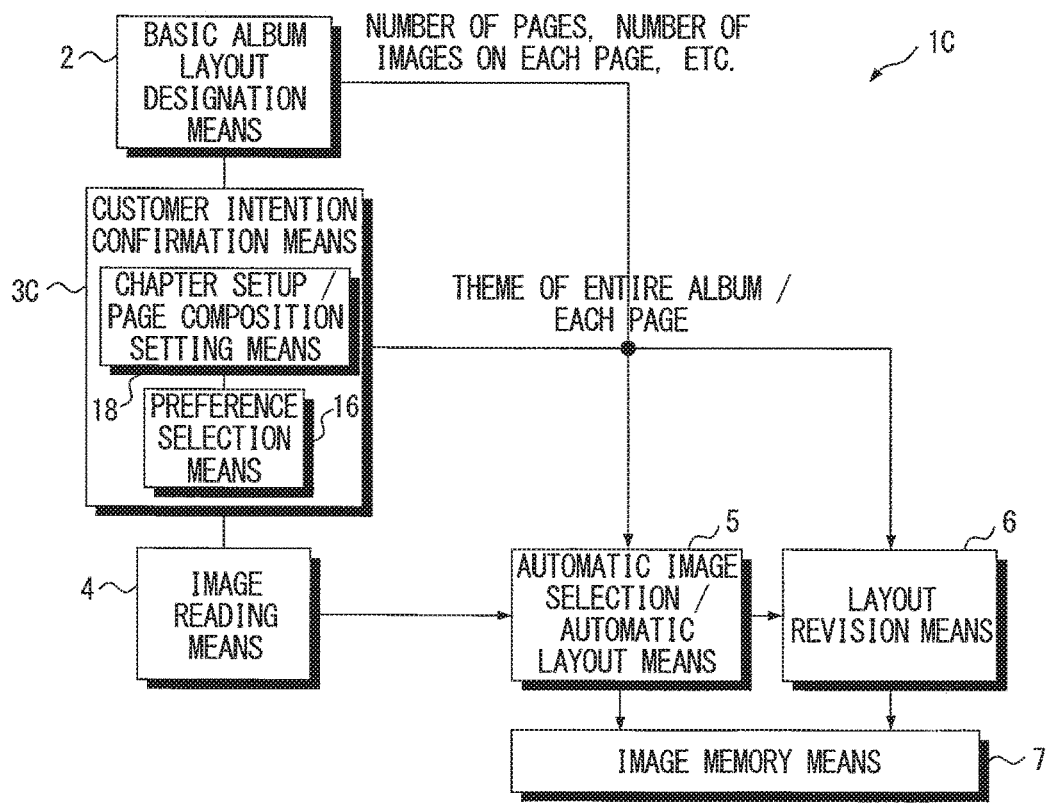

FIG. 4 is a functional block diagram of an electronic album apparatus 1C. Components in FIG. 4 identical with those shown in drawings such as FIG. 1 are designated by like reference characters and need not be described again.

Customer intention confirmation means 3C, which corresponds to the customer intention confirmation means 3 described above, includes chapter setup/page composition setting means 18 and preference selection means 16. A theme such as chapter setup and page composition in line with user intention is set by the chapter setup/page composition setting means 18, and the set theme is selected by the preference selection means 16. An electronic album in accordance with the selected theme is generated.

Figure 5:
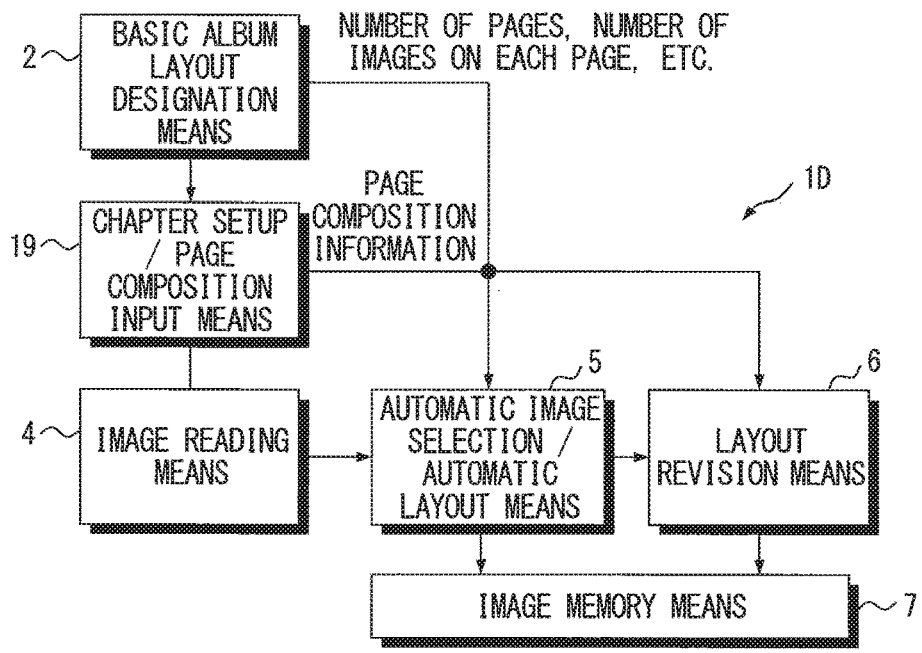

FIG. 5 is a functional block diagram of an electronic album apparatus 1D. Components in FIG. 5 identical with those shown in drawings such as FIG. 1 are designated by like reference characters and need not be described again.

Page composition information and the like is input to the electronic album apparatus 1D from chapter setup/page composition input means 19. An electronic album is created using the page composition information that is input thereto.

Figure 6:
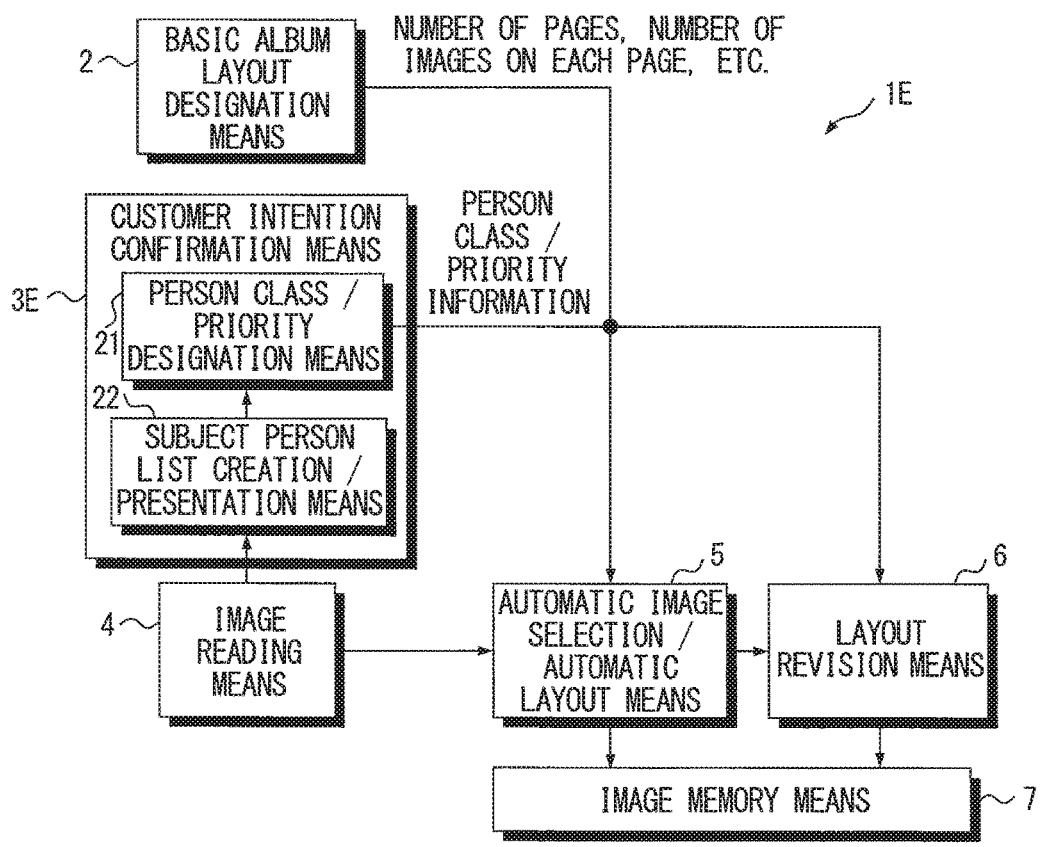

FIG. 6 is a functional block diagram of an electronic album apparatus 1E. Components in FIG. 6 identical with those shown in drawings such as FIG. 1 are designated by like reference characters and need not be described again.

Customer intention confirmation means 3E, which corresponds to the customer intention confirmation means 3 described above, includes person class/priority designation means 21 and subject person list creation/presentation means 22. The subject person list creation/presentation means 22 creates and presents a list of persons who are the photographic subjects. From within the person list presented by the subject person list creation/presentation means 22, the person class/priority designation means 21 designates person classes such as persons to be included in the electronic album, persons not to be included in the electronic album (persons the user does not wish to see) and irrelevant persons (persons who may be ignored), and designates a priority among these person classes.

Figure 7:
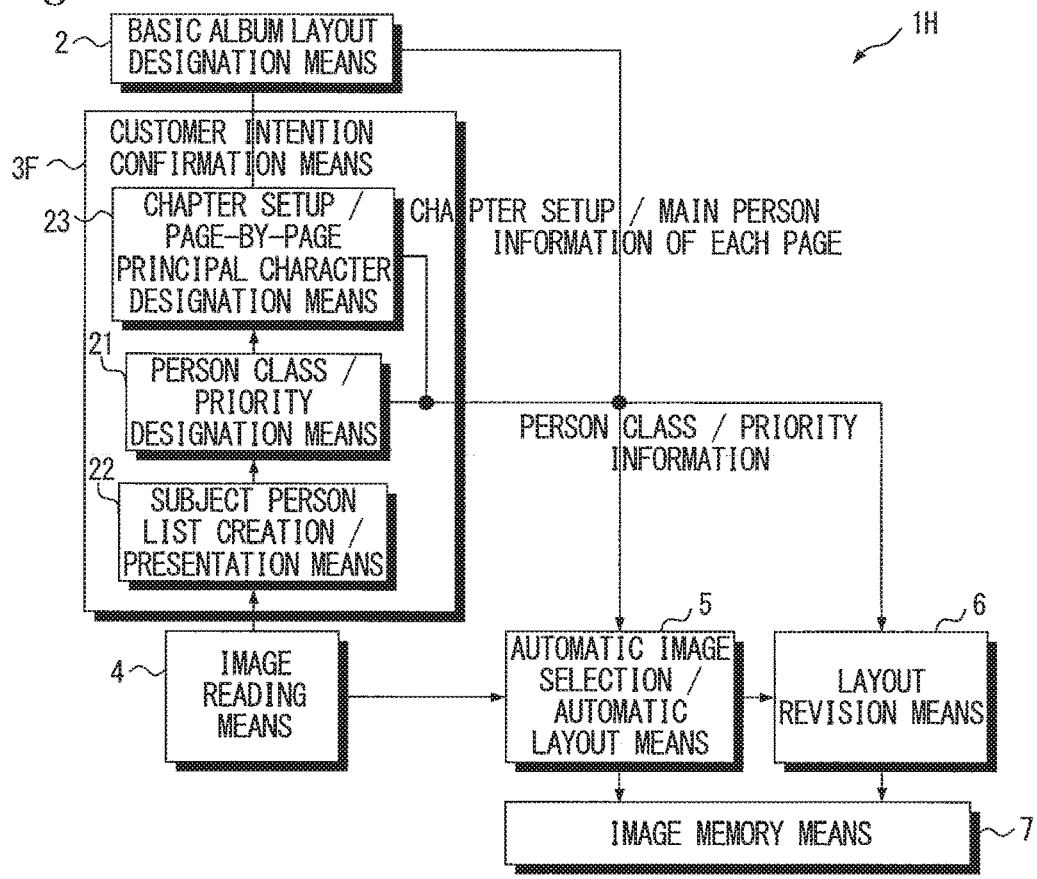

FIG. 7 is a functional block diagram of an electronic album apparatus 1F. Components in FIG. 7 identical with those shown in drawings such as FIG. 1 are designated by like reference characters and need not be described again.

Customer intention confirmation means 3G, which corresponds to the customer intention confirmation means 3 described above, includes chapter setup/page-by-page principal character designation means 23 in addition to the person class/priority designation means 21 and subject person list creation/presentation means 22. The principal character of each chapter or each page is designated by the chapter setup/page-by-page principal character designation means 23, and an electronic album is created in which the principal character designated in each chapter or on each page is the main character.

Figure 8:
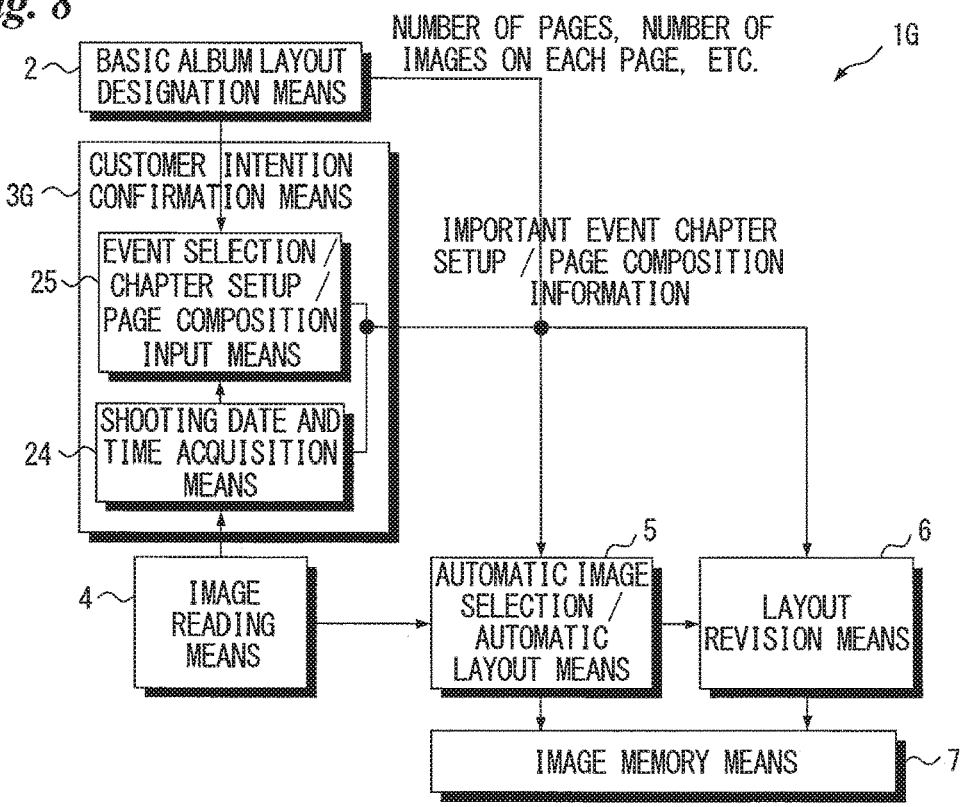

FIG. 8 is a functional block diagram of an electronic album apparatus 1G. Components in FIG. 8 identical with those shown in drawings such as FIG. 1 are designated by like reference characters and need not be described again.

Figure 9:
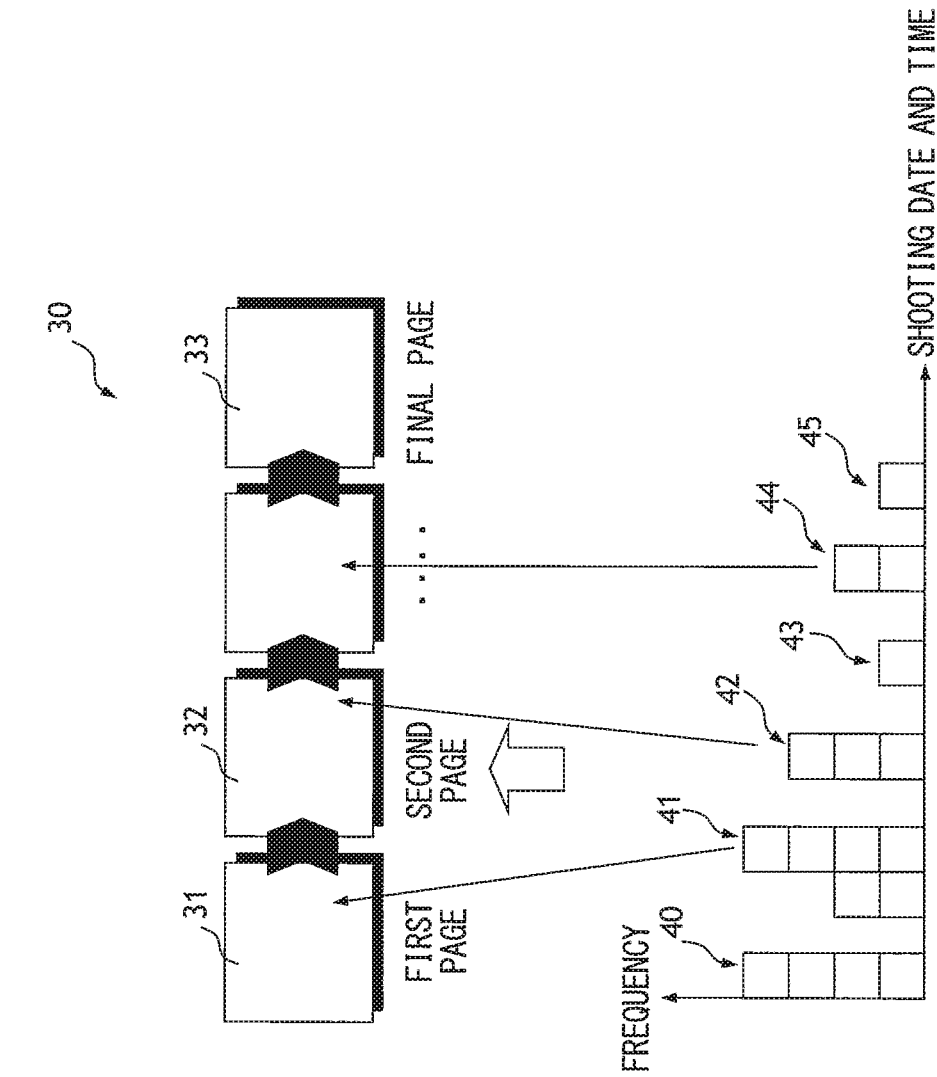
FIG. 9 illustrates the manner in which an electronic album of shooting events is created.

The customer intention confirmation means 3G, which corresponds to the customer intention confirmation means 3 described above, includes shooting date and time acquisition means 24 and event selection/chapter setup/page composition input means 25. A number of images represented by image files that have been read by the image reading means 4 are grouped into multiple image groups 40 to 45 per shooting date and time acquired by the shooting date and time acquisition means 24, as illustrated in FIG. 9. If images are images that have been captured in the same event, the shooting dates and times will be close together. Therefore, the groups of images of the respective image groups 40 to 45 divided according to shooting date and time are considered to have been obtained in the respective events. Images are extracted per each of the image groups 40 to 45 and are assigned to a first page 31, second page 32 and final page 3*n* of an electronic album 30. For example, an electronic album of events can be created in such a manner that the album cover and first and second pages will be images of a wedding ceremony, the third and fourth pages will be images of a honeymoon journey, the fifth page will be images of a summer holiday and the final page will be images of a family gathering.

Figure 10:
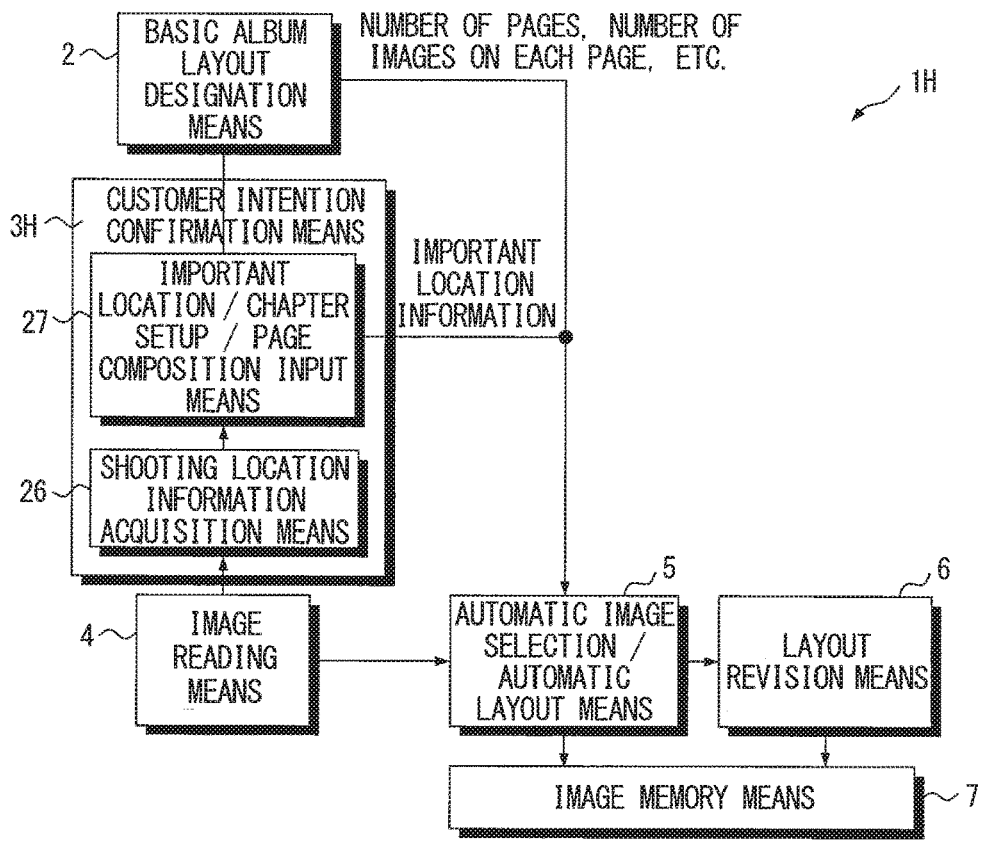
FIGS. 10 and 11 are functional block diagrams of each illustrating an electronic album apparatus.

FIG. 10 is a functional block diagram of an electronic album apparatus 1H. Components in FIG. 10 identical with those shown in drawings such as FIG. 1 are designated by like reference characters and need not be described again.

Customer intention confirmation means 3H, which corresponds to the customer intention confirmation means 3 described above, includes shooting location information acquisition means 26 and important location/chapter setup/page composition input means 27. The shooting location information acquisition means 26 acquires the shooting location of images for an electronic album. The shooting location information acquisition means 26 is capable of acquiring the shooting location by reading the shooting location recorded in the header of the image file. By acquiring the shooting location from the image file, it is possible to create an electronic album in which images for which the shooting locations are close together are gathered together on the same page. For example, it is possible to assign images of seasonal scenery to the album cover, assign seasonal images of one's residential surroundings to the first and second pages, assign seasonal images of Mt. Fuji to the third and fourth pages, assign seasonal images of Mt. Haku to the fifth and sixth pages, and assign images of the user's home and surroundings to the seventh and eighth pages. Similarly, it is possible to assign images of a principal journey to the album cover, assign images of the user's home and surroundings to the first and second pages, assign images of a journey to Atami to the third and fourth pages, assign images of a journey to Nara and Kyoto to the fifth and sixth pages, and assign images of a journey to Hokkaido to the seventh and eighth pages. Further, images that center on places often visited by the user or on other specific locations can also be assigned to the electronic album. Thus, an electronic album limited to important locations can be created, and it is also possible to assign images to an electronic album uniformly without limitation with regard to important locations.

Figure 11:
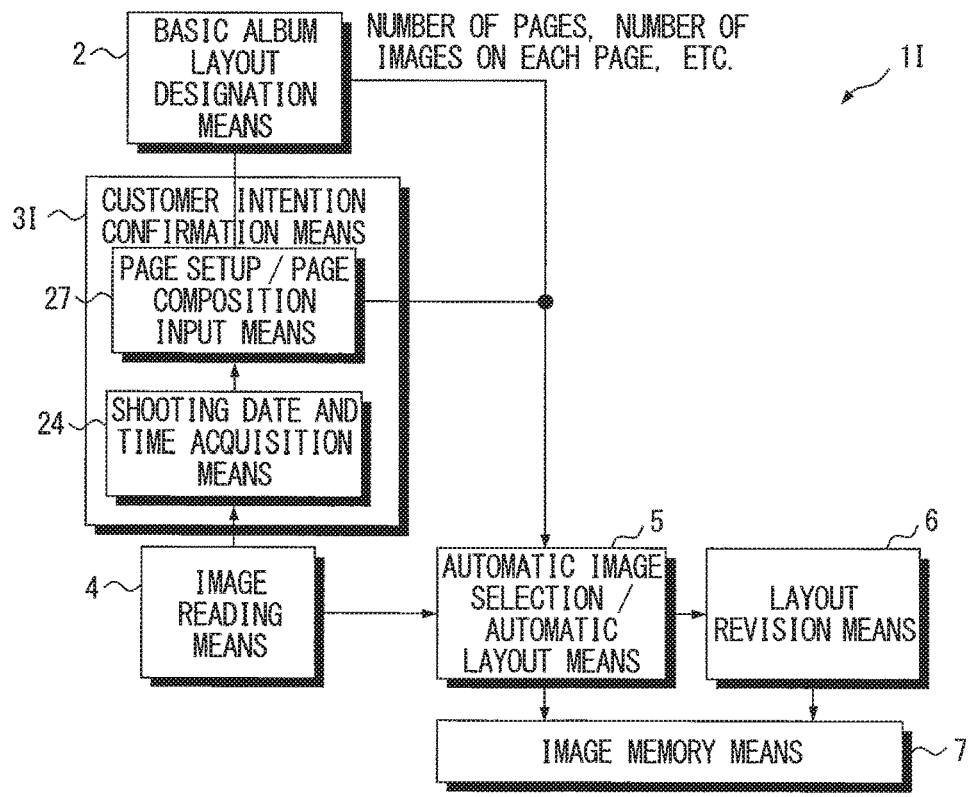

FIG. 11 is a functional block diagram of an electronic album apparatus 1I. Components in FIG. 11 identical with those shown in drawings such as FIG. 1 are designated by like reference characters and need not be described again.

Customer intention confirmation means 3I, which corresponds to the customer intention confirmation means 3 described above, includes the shooting date and time acquisition means 24 and chapter setup/page composition input means 27. Shooting date and time recorded in the header of an image file for an electronic album is acquired by the shooting date and time acquisition means 24. The chapters and pages constituting the electronic album based upon the acquired date and time will be in line with the intentions of the user. For example, an electronic album can be created in such a manner that the album cover will have images of the user playing with children, the first and second pages will have images of play, and the third and fourth pages will have images of sleeping faces.

Figure 12:
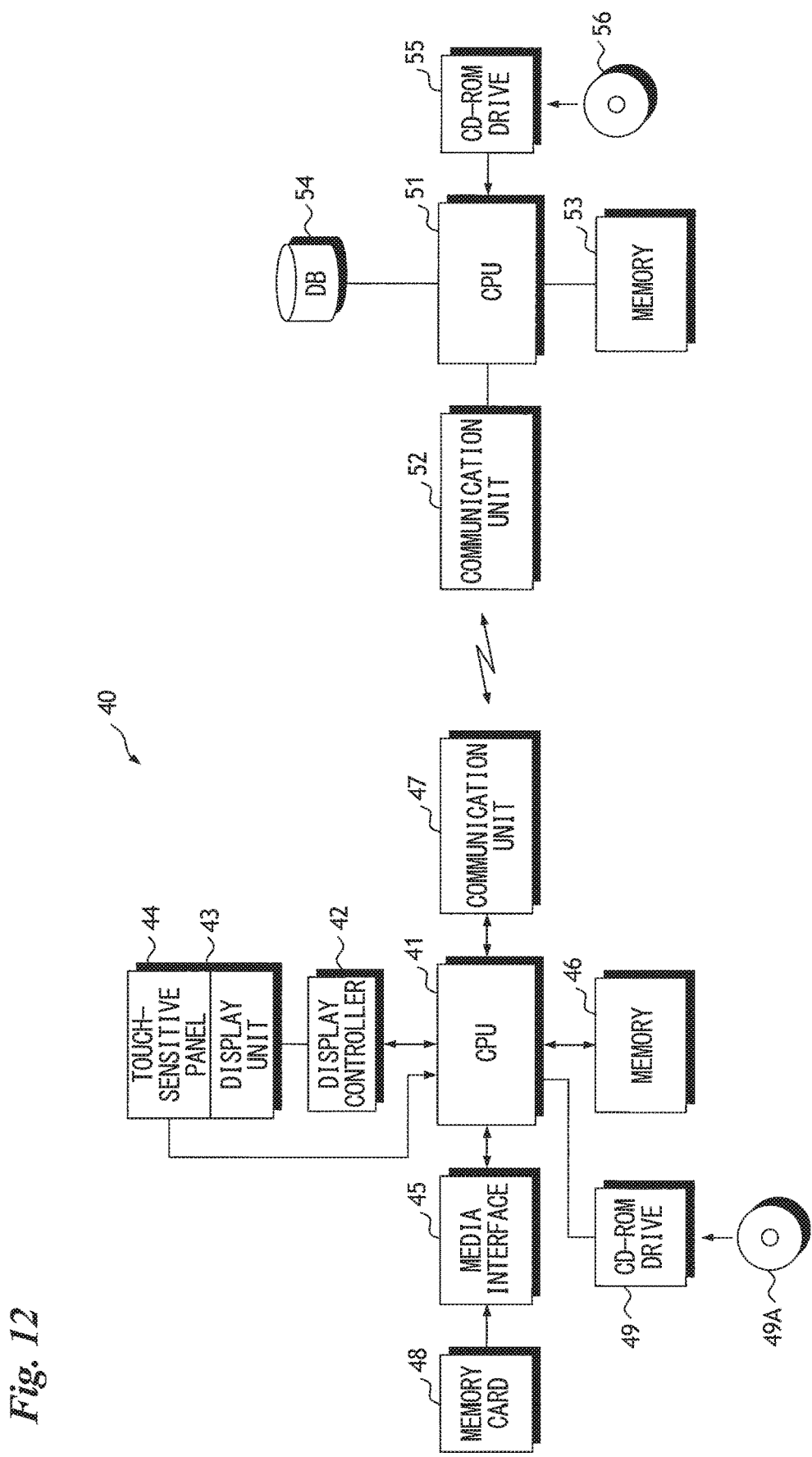
FIG. 12 is a block diagram illustrating the electrical configurations of an over-the-counter accepting apparatus and album layout apparatus.

FIG. 12 is a block diagram illustrating the electrical configurations of an over-the-counter accepting apparatus 40 and album layout apparatus 50 constituting an electronic album apparatus.

The over-the-counter accepting apparatus 40 and album layout apparatus 50 are capable of communicating with each other via network such as the Internet. Naturally, a single apparatus combining the over-the-counter accepting apparatus 40 and album layout apparatus 50 may be constructed as the electronic album apparatus. Although the over-the-counter accepting apparatus 40 is installed in a store such as a supermarket or convenience store, it may be arranged so that the functions of the over-the-counter accepting apparatus 40 are incorporated in a personal computer and an electronic album is created by making it possible for the personal computer and album layout apparatus 50 to communicate with each other.

The overall operation of the over-the-counter accepting apparatus 40 is controlled by a CPU 41.

The over-the-counter accepting apparatus 40 includes a CD-ROM drive 49. When a CD-ROM 49A, which contains an operation program for controlling operation described later, is loaded in the CD-ROM drive 49, the operation program is read by the CD-ROM drive 49. The operation described later is carried out by installing the read operation program in the over-the-counter accepting apparatus 40. It may of course be arranged so that the operation program is received via a network and then installed without the program having been stored on a recording medium such as the CD-ROM 49A. Further, a memory 46 for storing data and the like temporarily is also connected to the CPU 41.

The over-the-counter accepting apparatus 40 is provided with a media interface 45. Image files for an electronic album, which have been stored on a memory card 48 brought by the user, are read by the media interface 45. The read images files are stored in the memory 46 temporarily.

The over-the-counter accepting apparatus 40 includes a display unit 43 controlled by a display controller 42. Read images and the like are displayed on the display screen of the display unit 43. A touch-sensitive panel 44 is formed on the display screen of the display unit 43. Commands and the like from the user are applied to the over-the-counter accepting apparatus 40 by utilizing the touch-sensitive panel 44. The over-the-counter accepting apparatus 40 also includes a communication unit 47 for communicating with the album layout apparatus 50.

The overall operation of the album layout apparatus 50 is controlled by a CPU 51.

The album layout apparatus 50 is provided with a CD-ROM drive 55. By loading a CD-ROM 56, which contains an operation program for controlling operation described later, in the CD-ROM drive 55, the operation program is read and installed in the album layout apparatus 50. Further connected to the CPU 51 is a memory 53 for storing data temporarily.

Further, the album layout apparatus 50 includes a database 54 for storing data and the like representing a created electronic album. The album layout apparatus 50 further includes a communication unit 52 for communicating with the over-the-counter accepting apparatus 40.

Figure 13:
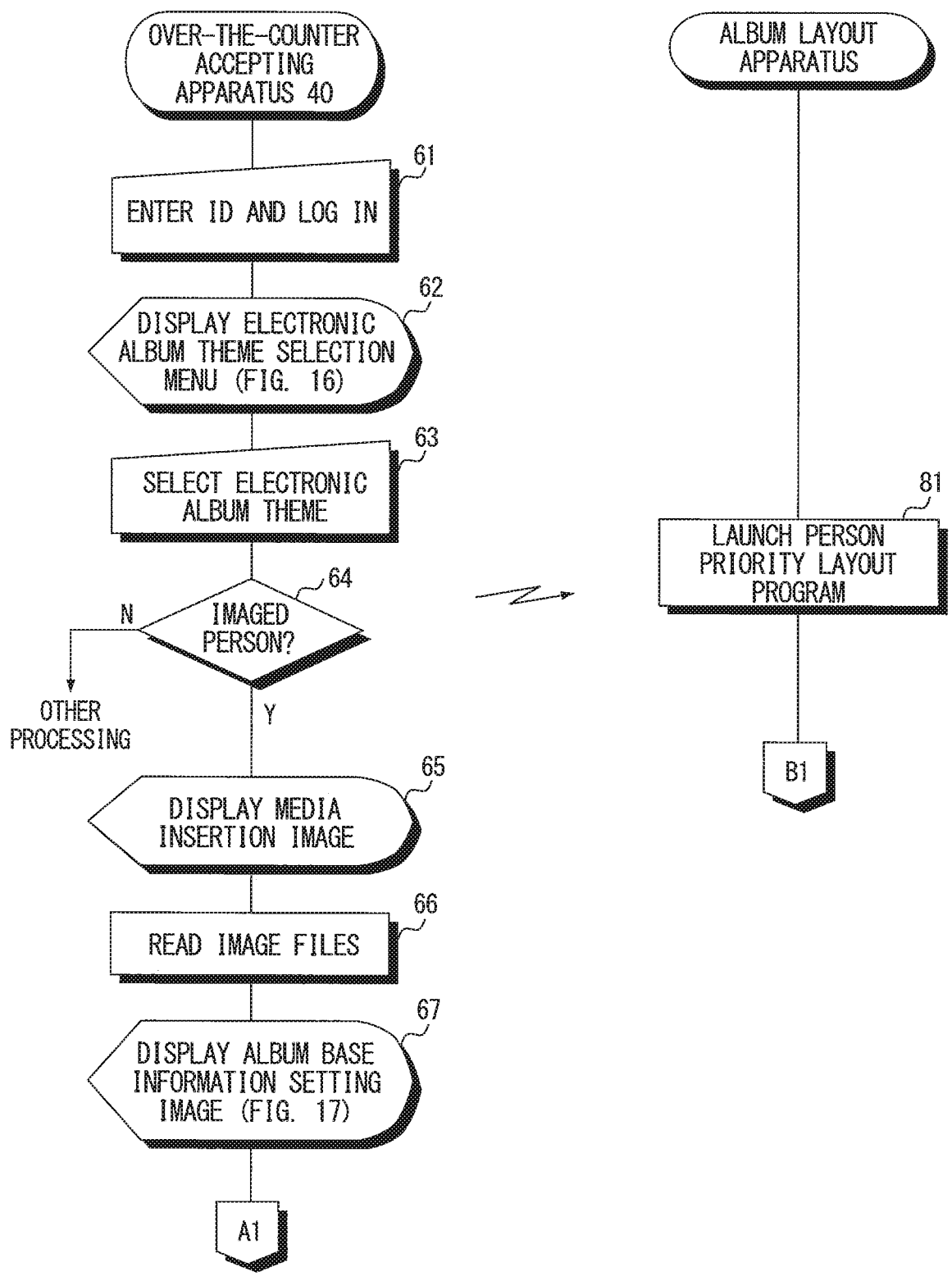
FIGS. 13 to 15 are flowcharts illustrating processing executed by the over-the-counter accepting apparatus and album layout apparatus.
Figure 14:
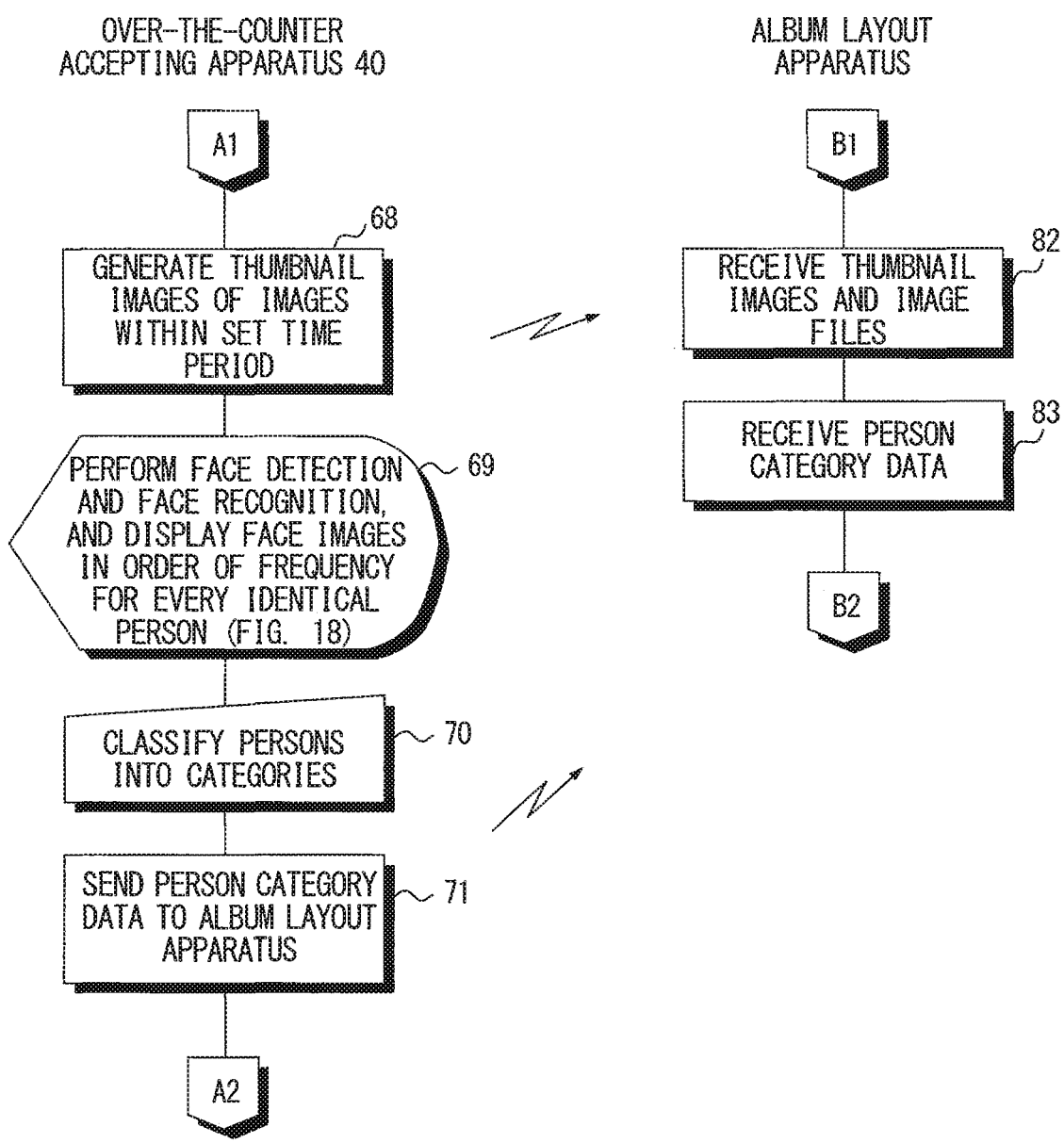
Figure 15:
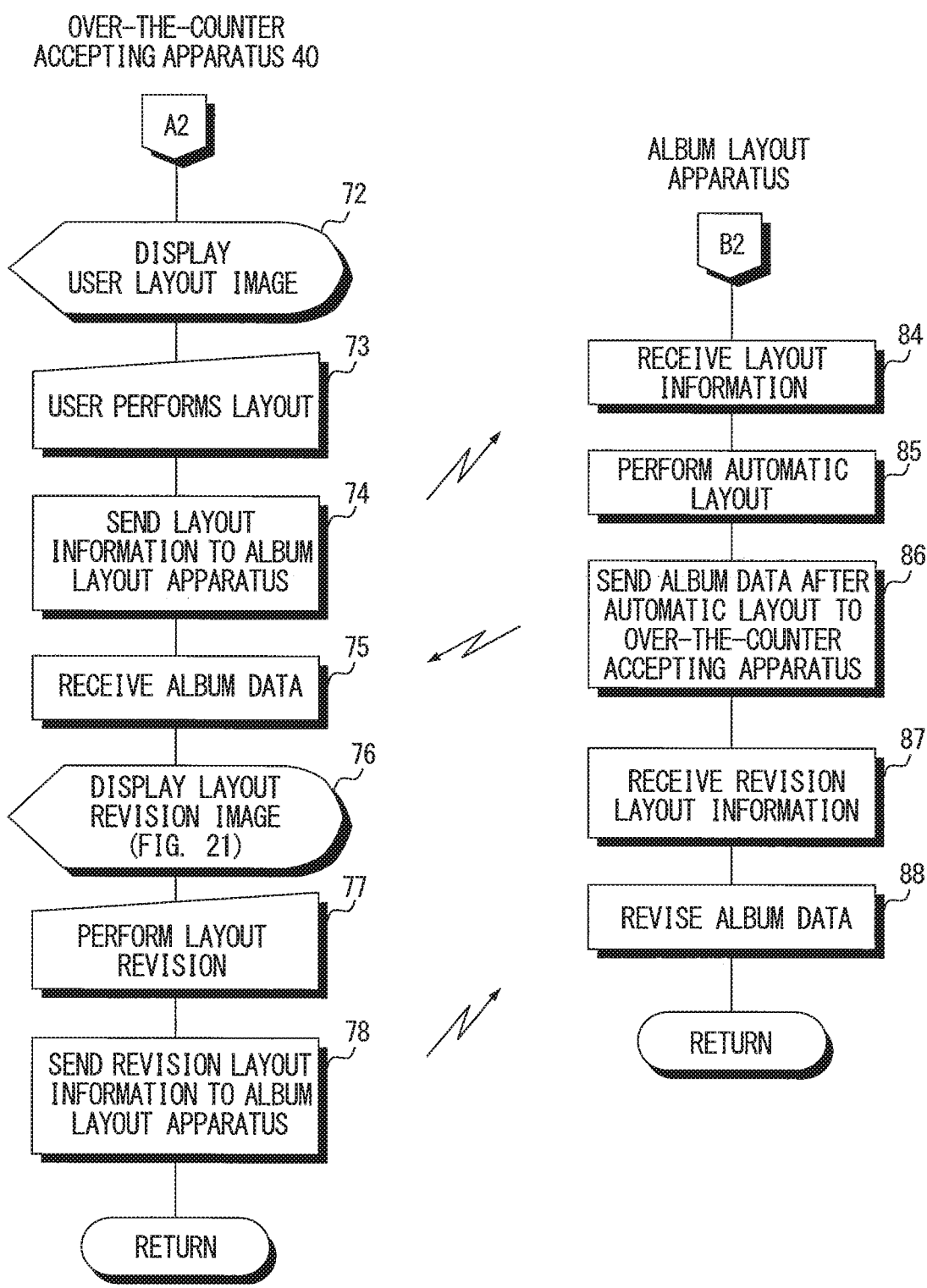

FIGS. 13 to 15 are flowcharts illustrating processing executed by the over-the-counter accepting apparatus 40 and album layout apparatus 50.

A user wishing to create an electronic album proceeds to the over-the-counter accepting apparatus 40 taking with him the memory card 48 storing a number of image files for the electronic album. A start area, which is being displayed on the display screen of the display unit 43 of the over-the-counter accepting apparatus 40, is touched by the user, whereupon a user ID input area appears on the display screen. The user inputs a previously acquired user ID and logs in to the over-the-counter accepting apparatus 40 (step 61). In response, an electronic album theme selection menu is displayed on the display screen of the over-the-counter accepting apparatus 40 (step 62). Utilizing the electronic album theme selection menu, the user selects (sets) the theme of the electronic album (step 63).

Figure 16:
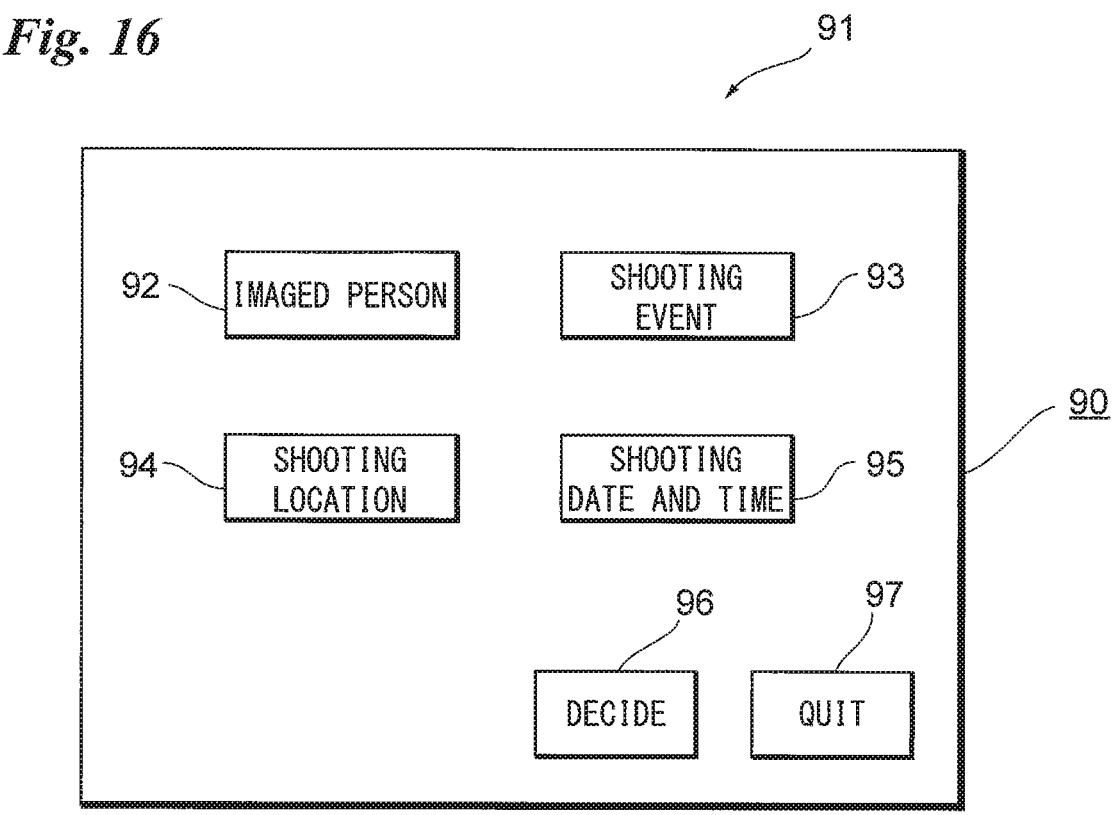
FIGS. 16 to 18 are examples of display screens of the over-the-counter accepting apparatus.

FIG. 16 is an example of an electronic album theme selection menu 91 displayed on a display screen 90.

The electronic album theme selection menu 91 includes an imaged person theme setting area 92 bearing characters reading "IMAGED PERSON"; a shooting event theme setting area 93 bearing characters reading "SHOOTING EVENT"; a shooting location theme setting area 94 bearing characters reading "SHOOTING LOCATION"; and a shooting date and time theme setting area 95 bearing characters reading "SHOOTING DATE AND TIME". The areas 92 to 95 are utilized when the user sets a theme for an electronic album. The imaged person theme setting area 92 is touched by the user when an imaged person is adopted as the theme of the electronic album to be created. The shooting event theme setting area 93 is touched by the user when a shooting event is adopted as the theme of the electronic album to be created. The shooting location theme setting area 94 is touched by the user when a shooting location is adopted as the theme of the electronic album to be created. The shooting date and time theme setting area 95 is touched by the user when the shooting date and time is adopted as the theme of the electronic album to be created. By touching any one of the areas 92 to 95, the user sets the theme of the electronic album to be created.

The electronic album theme selection menu 91 further includes a decision area 96 bearing characters reading "DECIDE", and quit area 97 bearing characters reading "QUIT". The decision area 96 is touched by the user when the user decides upon a theme corresponding to the area touched by the user among the areas 92 to 95. The quit area 97 is touched by the user when creation of the electronic album is terminated.

With reference again to FIG. 13, it is assumed in this embodiment that the theme set is an imaged person ("YES" at step 64). When this theme is set, data representing the set theme is sent from the over-the-counter accepting apparatus 40 to the album layout apparatus 50. A person priority layout program corresponding to the set theme is launched in the album layout apparatus 50 (step 81).

When the theme of the electronic album is set, a media insertion image is displayed on the display screen (step 65). The user who has brought the memory card 48 inserts the card into the over-the-counter accepting apparatus 40. When this is done, a number of image files that have been stored on the memory card 48 are read by the over-the-counter accepting apparatus 40 (step 66).

An album base information setting image is displayed on the over-the-counter accepting apparatus 40 (step 67).

Figure 17:
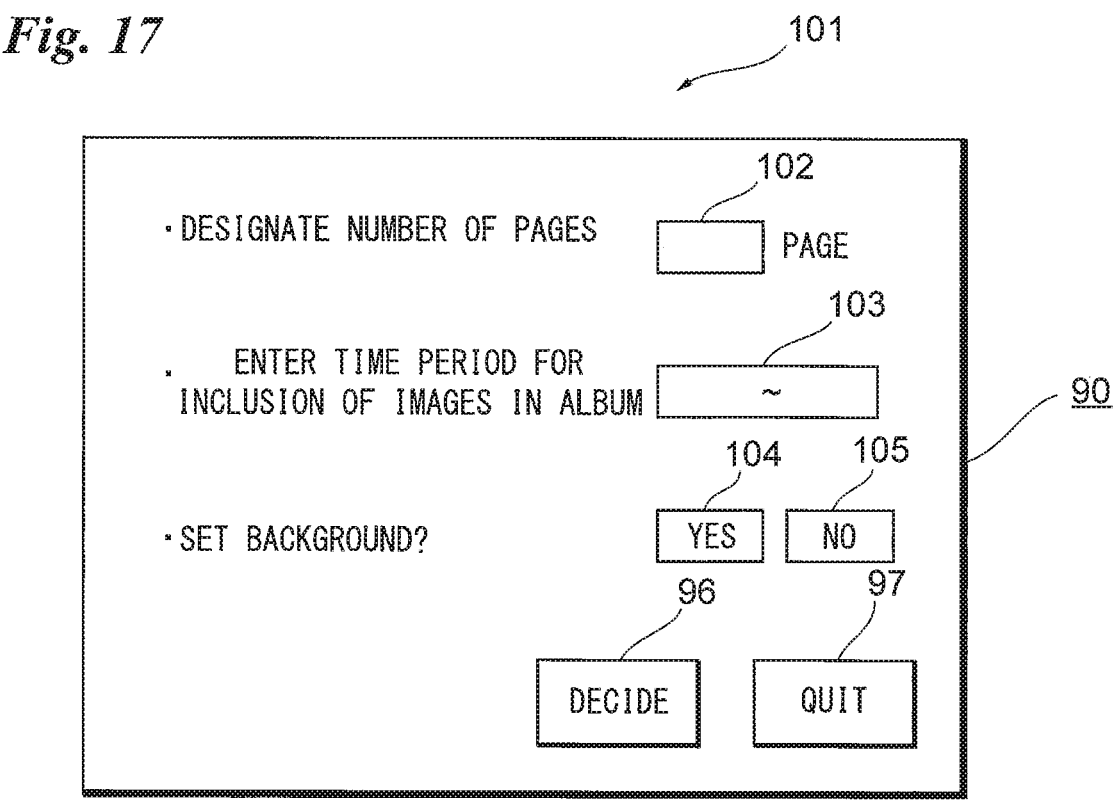

FIG. 17 is one example of an album base information setting image 101 displayed on the display screen 90.

The album base information setting image 101 is for inputting basic information about the electronic album to be created. The album base information setting image 101 includes a page number display area 102, a time period display area 103, and background setting areas 104 and 105 bearing characters reading "YES" and "NO", respectively. When the page number display area 102 is touched, a pull-down or pull-up image appears in the area 102. By touching the pull-down or pull-up image, the pages of the electronic album are entered and displayed in the area 102. Similarly, when the time period display area 103 is touched, a calendar is displayed and the shooting time period is set using the displayed calendar. The electronic album is created using images that were captured within the set shooting time period. In a case where a background is set for each page constituting the electronic album, the area 104 bearing the characters reading "YES" is touched. When this is done, background sample images that include a number of background samples appear on the display screen 90. A background is selected utilizing the background samples included in the background sample images. In a case where a background is not to be set for each page constituting the electronic album, the area 105 bearing the characters reading "NO" is touched. When input of the number of pages of the electronic album is finished, the user touches the quit area 97.

With reference to FIG. 14, the over-the-counter accepting apparatus 40 generates thumbnail images of images represented by image files, which have been obtained by image capture within the set time period, from among the image files read from the memory card 48 (step 68). Data representing the generated thumbnail images is sent from the over-the-counter accepting apparatus 40 to the album layout apparatus 50 and is received by the album layout apparatus 50 (step 82). It goes without saying that whether an image file is one obtained by image capture within the set time period can be ascertained if the shooting date and time recorded in the header of the image file is checked, at set forth above. Face detection and face recognition are carried out using the generated thumbnail images or the read images, and face images of the same person (or the images themselves) are displayed on the display screen 90 in the order of frequency of capture (step 69). Since the theme of the electronic album that has been set by the user is a person whose images have been captured, images such as scenery images in which the person does not appear are not displayed; the images displayed are images (face images) that are in accordance with the theme. It goes without saying that which images are images in accordance with the theme are predetermined for every theme.

Figures 18, 19:
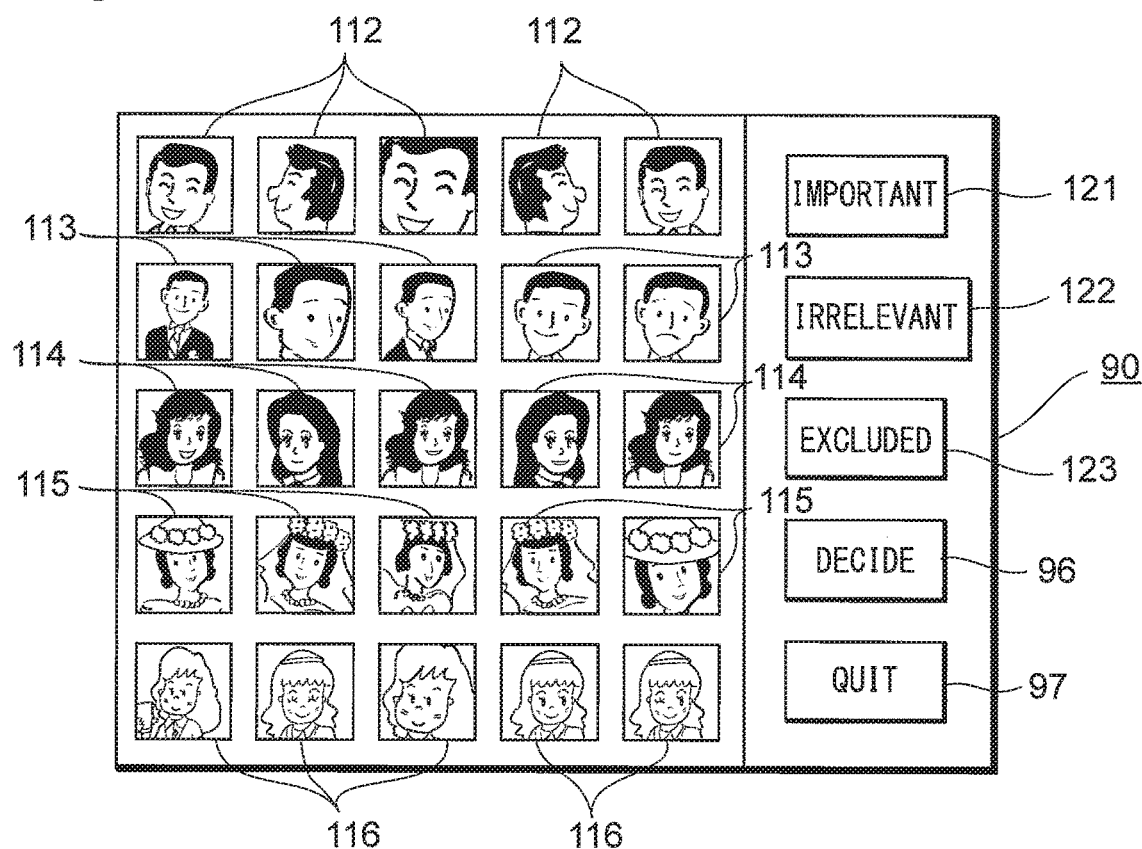
FIG. 19 is an example of a person category table.

FIG. 18 illustrates the manner in which face images of the same person are being displayed on the display screen 90 in order of frequency of appearance.

A face image list display area 111 has been formed on the display screen 90. Face images are being displayed in the area 111 in order of frequency of appearance in such a manner that the same person can be distinguished from other persons.

Face images 112 in the first row are the face images of a person having the highest frequency of appearance. Similarly, face images 113 in the second row, face images 114 in the third row, face images 115 in the fourth row and face images 116 in the fifth row are the face images of persons having the second, third, fourth and fifth highest frequencies of appearance, respectively. These face images 112 to 116 are such that face images of the same person are arranged in the same row. By scrolling in the horizontal direction, face images not being displayed in the area 111 will appear in the area 111. By scrolling in the vertical direction, face images having other frequencies of appearance not being displayed in the area 111 will appear in the area 111.

Formed on the right side of the face image list display area 111 are an important image setting area 121 bearing characters reading "IMPORTANT", an irrelevant image setting area 122 bearing characters reading "IRRELEVANT", and an excluded image setting area 123 bearing characters reading "EXCLUDED". The important image setting area 121 is utilized when the user decides that an image among the read images is considered important. The irrelevant image setting area 122 is utilized when the user decides that an image among the read images is neither important nor unimportant. The excluded image setting area 123 is utilized when the user decides that an image among the read images is one not desired to be placed in the electronic album.

From among the face images being displayed in the face image list display area 111, the face image of a person that the user considers important is dragged and dropped onto the important image setting area 121, whereby the image containing the person specified by this image is decided upon as an important image. Similarly, from among the face images being displayed in the face image list display area 111, the face image of a person that the user considers neither important nor unimportant is dragged and dropped onto the irrelevant image setting area 122, whereby the image containing the person specified by this image is decided upon as an irrelevant image, and the face image of a person that the user considers unimportant is dragged and dropped onto the excluded image setting area 123, whereby the image containing the person specified by this image is decided upon as an excluded image. When important images and the like are decided, the user touches the decision area 96.

With reference again to FIG. 14, persons are classified into categories (important, irrelevant, excluded) in response to the user deciding important images and the like in the manner described above (step 70). When this is done, person category data is sent from the over-the-counter accepting apparatus 40 to the album layout apparatus 50 (step 71). The person category data sent from the over-the-counter accepting apparatus 40 is received by the album layout apparatus 50 (step 83).

FIG. 19 is an example of person category data (in the form of a table).

"IMPORTANT", "IRRELEVANT" and "EXCLUDED" have been defined as person categories. Pluralities of face images 131 to 135, 141 to 145 and 151 to 155 have been defined in correspondence with these person categories. The face images 131 to 135 are face images that have been dragged and dropped onto the important image setting area 121, as described above with reference to FIG. 18, or the face images (ascertained by face recognition processing) of a person whose face image is the same as these face images. These face images 131 to 135 may include a plurality of face images of the same person or only a representative face image of the same person. Similarly, the face images 141 to 145 are face images that have been dragged and dropped onto the irrelevant image setting area 122 or the face images of a person whose face image is the same as these face images, and the face images 151 to 155 are face images that have been dragged and dropped onto the excluded image setting area 123 or the face images of a person whose face image is the same as these face images. Thus, which persons are important, irrelevant or subject to exclusion can be ascertained from the person category data.

With reference to FIG. 15, a user layout image is displayed on the display screen 90 of the over-the-counter accepting apparatus 40 (step 72). By utilizing the user layout image displayed on the display screen 90, the user can cause each page constituting the electronic album to reflect the user's own intentions (step 73).

Figure 20:
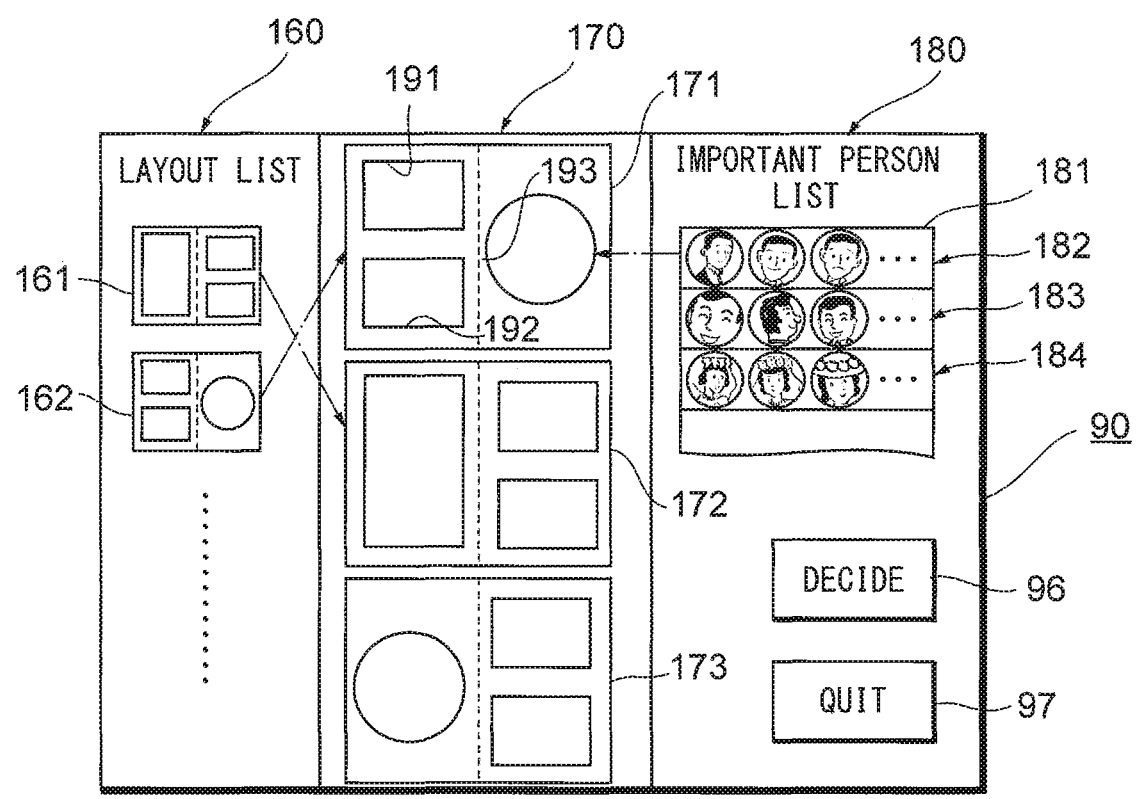
FIGS. 20 and 21 are examples of display screens of the over-the-counter accepting apparatus.

FIG. 20 is an example of a user layout image.

The user layout image includes a layout list display area 160, a page image display area 170 and an important person list display area 180. Displayed in the layout list display area 160 are a plurality of predetermined layout images 161, 162, etc., of each page that will constitute the electronic album. The pages that will constitute the electronic album are displayed in the page image display area 170 from the top down in the order of the pages. From among the layout images being displayed in the layout list display area 160, the user drags and drops the layout image having the desired layout in such a manner that this layout image will be that of the desired page. For example, in a case where the user desires the layout of layout image 162 to be the layout of the first and second pages of the electronic album, the user drags and drops the layout image 162 so that it will be at the top of each page image being displayed in the page image display area 170. Similarly, in a case where the user desires the layout of layout image 161 to be the layout of the third and fourth pages of the electronic album, the user drags and drops the layout image 161 so that it will be the second from the top of each page image being displayed in the page image display area 170. For example, a page image 171 is that of the first and second pages, a page image 172 is that of the third and fourth pages, and a page image 173 is that of the fifth and sixth pages. Image display frames 191 to 193 to which images are to be assigned have been formed in the page image 171 (image frame areas are similarly formed in the other page images as well).

An important person list 181 is displayed in the important person list display area 180. Different face images of the same person are being displayed in the important person list 181 per row thereof. For example, face images 182 (or full images rather than face images) in the first row of the important person list 181 represent different face images of a person classified into a category as an important person in the manner described above. Similarly, face images 183 in the second row of the important person list 181 represent a person (a person different from the person of faces images 182) classified into a category as an important person. Face images 184 in the third row of the important person list 181 represent a person different from those of the face images 182 and 183 but one classified into a category as an important person. From among the face images (or full images) included in the important person list 181, the user drags and drops a desired face image into a desired image display frame of a desired page image among the page images being displayed in the page image display area 170. In response, the image that has been dragged and dropped is displayed within this image display frame. It goes without saying that in a case where the images being displayed in the important person list 181 are face images, the full image that includes the dragged and dropped face image is displayed within the image display frame. In this way a desired important person being displayed in the important person list 181 can be assigned to a desired image display frame of a desired page image. It may also be arranged to execute automatic layout processing, which will be described later, in such a manner that an image display frame included in a page image identical with a page image to which the image of an important person has been assigned will have assigned to it an image that includes the assigned important person. The important person will thus not fail to be included on each page image. For example, an electronic album can be created in such a manner that one's first-born son will always be included on the first and second pages of the album and one's second-born son always included on the third and fourth pages. It thus becomes possible to create an electronic album in line with the user's intentions not just for the entire electronic album but on a per-page basis. It is of course permissible to employ automatic layout (step 85), described later, without executing layout processing involving the user at steps 72 and 73.

When layout by the user is finished, the user touches the decision area 96, whereupon the layout information representing the album layout performed by the user (namely such information as the sequence of the page images and which images were dragged and dropped into which of the image display frames of which page images) is sent from the over-the-counter accepting apparatus 40 to the album layout apparatus 50 (step 74).

When the layout information sent from the over-the-counter accepting apparatus 40 is received by the album layout apparatus 50 (step 84), the album layout apparatus 50 executes automatic layout based upon the received layout information (step 85). In automatic layout, images are assigned to image display frames other than the image display frames into which images were dragged and dropped by the user in the manner described above. It may be arranged so that important persons are assigned to all image display frames, as described above, or it may be arranged so that the images of important persons are assigned to image display frames in a proportion greater than the proportion of images of irrelevant persons assigned to image display frames. In either case, the proportion of images of important persons included in the electronic album will be greater than the proportion of images of irrelevant persons included in the electronic album. Further, automatic layout is performed in such a manner that images of excluded persons are not included in the electronic album.

When automatic layout is performed in the album layout apparatus 50 and images are assigned to the image display frames of all page images constituting the electronic album, data representing such as electronic album is sent from the album layout apparatus 50 to the over-the-counter accepting apparatus 40 (step 86).

When the data representing the electronic album sent from the album layout apparatus 50 is received by the over-the-counter accepting apparatus 40 (step 75), a layout revision image 210 is displayed on the display screen 90 of the over-the-counter accepting apparatus 40 in order to revise the layout and check the content of the electronic album (step 76).

Figure 21:
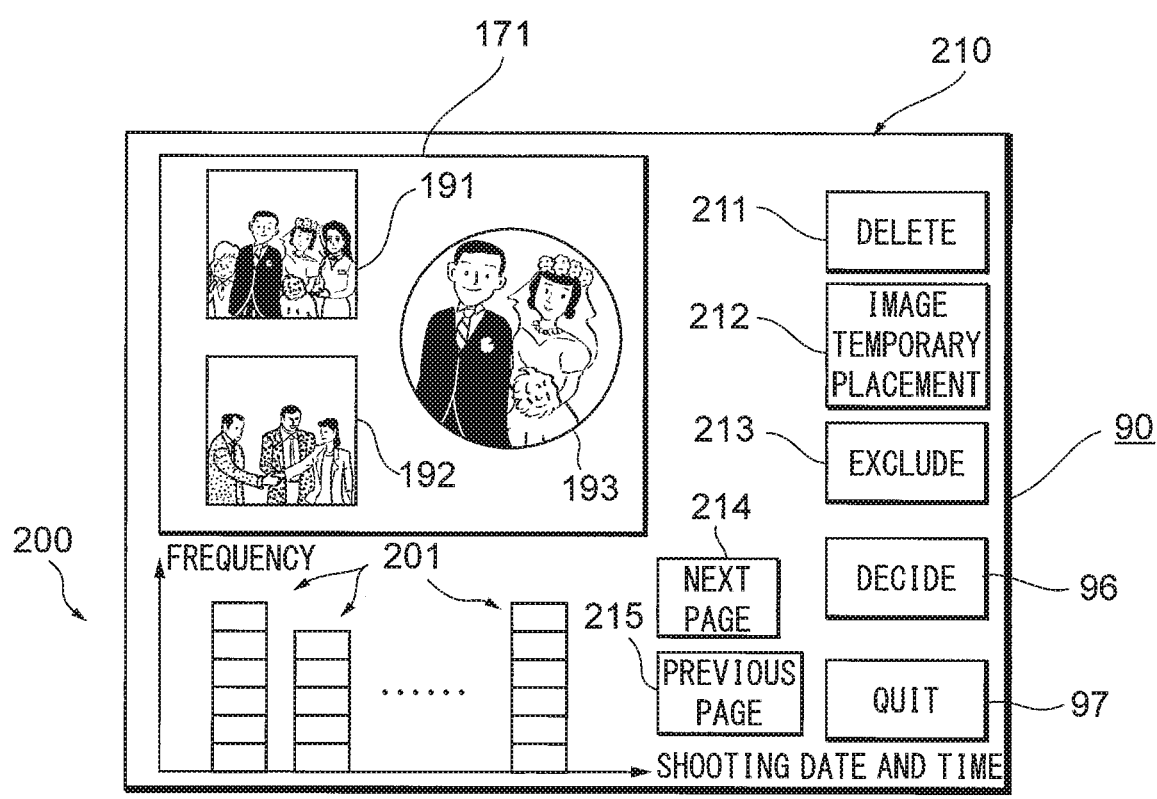

FIG. 21 is an example of the layout revision image 210.

The page image 171 constituting the electronic album is being displayed at the upper left of the layout revision image 210. The page image 171 includes the image display frames 191, 192 and 193. Images assigned by the user or images assigned by automatic layout are being displayed in these image display frames 191, 192 and 193.

Below the page image 171 is a list display area 200 in which thumbnail images 201 of the images read from the memory card 48 are being displayed in order of shooting date and time. Displayed on the right side of the page image 171 are a delete area 211 bearing characters reading "DELETE"; an image temporary placement area 212 bearing characters reading "IMAGE TEMPORARY PLACEMENT"; an exclusion area 213 bearing characters reading "EXCLUDE"; a next-page area 214 bearing characters reading "NEXT PAGE"; a previous-page area 215 bearing characters reading "PREVIOUS PAGE"; and the decision area 96 and quit area 97. When the images being displayed in the image display areas 191, 192, 193 of the page image 171 displayed in the layout revision image 210 are to be deleted and other images assigned, the images being displayed in these image display frames are dragged and dropped onto the delete area 211. When the images being displayed in the image display areas 191, 192, 193 of the page image 171 displayed in the layout revision image 210 are to be removed temporarily, the images being displayed in these image display frames are dragged and dropped onto the temporary placement area 212. The images that have been dragged and dropped onto the temporary placement area 212 are displayed on the temporary placement area 212 and are again dragged and dropped onto the image display frames 191, 192, 193 from the temporary placement area 212, whereby they are assigned to the image display frames 191, 192, 193 onto which they have been dragged and dropped. The exclusion area 213 is utilized to exclude the image of a person from the electronic album. Specifically, by dragging and dropping an image onto the exclusion area 213, the image of the person contained in this dragged and dropped image is excluded from the electronic album. By touching the next-page area 214, the page image that follows the page image 171 currently being displayed in the layout revision image 210 is displayed. By touching the previous-page area 215, the page image preceding the page image 171 currently being displayed in the layout revision image 210 is displayed. By dragging and dropping onto the delete area 211 the images that have been assigned to the image display frames 191, 192, 193 of the page image 171, the image display frames to which these images had been assigned become blank. By dragging and dropping onto a blank image display frame a thumbnail image 201 being displayed in the list display area 200, the image corresponding to this thumbnail image 201 is newly assigned to the image display frame.

When the electronic album is revised in the manner described above, revised layout information representing the revised layout is sent from the over-the-counter accepting apparatus 40 to the album layout apparatus 50 (step 78).

When the revised layout information sent from the over-the-counter accepting apparatus 40 is received by the album layout apparatus 50 (step 87), the album data that has been stored in the database 54 is revised (step 88).

In the foregoing embodiment, a person whose image has been captured is selected as the overall theme of the electronic album. However, similar processing can be implemented also in a case where a shooting event, shooting location or shooting date and time has been selected. For example, if a shooting event has been selected as the overall theme of the overall electronic album, it can be ascertained which event images from among a number of images are important by dragging and dropping one or multiple important event images onto the important image setting area 121 (see FIG. 18). Therefore it is judged that an image captured at approximately the same time as such an event image is an important image. An electronic album can be created by gathering only such important event images. Further, by dragging and dropping the image of an event onto each page, as shown in FIG. 20, each page can be made an image of a common event. Further, if a shooting location has been selected as the overall theme of the electronic album, it can be ascertained which shooting-location images from among a number of images are important by dragging and dropping one or multiple important shooting-location images onto the important image setting area 121. An electronic album can be created by gathering only such important shooting locations. By dragging and dropping the image of shooting location onto each page, as shown in FIG. 20, each page can be made an image of a shooting location. It goes without saying that at which shooting location an image has been captured will have been recorded in the header contained in the image file. Furthermore, if shooting date and time has been selected as the overall theme of the electronic album, then, by dragging and dropping the image of a specific page image, as shown in FIG. 20, an image captured at approximately the same date and time as that of this image can be assigned to the same page. Thus, an electronic album intended by the user can be created per page image. Naturally, common images such as images containing a specific person do not have to be assigned to the same page image; it will suffice if a common image is assigned to a nearby image display frame even if the page image is a different page image. Thus an image related to an important image designated by the user will be displayed in a nearby image display frame.

Furthermore, in the foregoing embodiment, there is one level of priority for important images but it may be arranged so that priority can be changed among important images. For example, the image of a first-born son or second-born son may be adopted as an important image of highest priority, the image of one's mother may be adopted as an important image of the next highest priority, and the image of one's father may be adopted as an important image given priority last. For example, automatic layout can be performed in such a manner that the proportion of images included in an electronic album is reduced in order of degree of importance.

In the foregoing embodiment, important persons (important images), excluded persons (excluded images), irrelevant persons (irrelevant images) and the like may be stored in the over-the-counter accepting apparatus 40 or album layout apparatus 50 per user ID. In a case where the user creates an electronic album again, processing similar to that described above can be executed utilizing important persons and the like already stored.

As many apparently widely different embodiments of the present invention can be made without departing from the spirit and scope thereof, it is to be understood that the invention is not limited to the specific embodiments thereof except as defined in the appended claims.

What is claimed is:
1. An electronic album apparatus comprising:
a storage storing instructions; and
a processor executing the instructions to perform:
  extracting face images from a plurality of images,
  controlling a display device to display the face images including a plurality of subjects,
  setting a first subject from the plurality of subjects as an important subject responsive to a designation from a user,
  setting a second subject from the plurality of subjects as an excluded subject responsive to a designation from a user,
  setting a priority for the important subject higher than a priority for a normal subject other than the important subject among the plurality of subjects,
  creating an electronic album from selected images among the plurality of images, wherein in the electronic album, a proportion of images including the important subject from the selected images is larger than a proportion of images including the normal subject from the selected images, and excluding images which correspond to the excluded subject from the selected images used to create the electronic album.

2. The apparatus according to claim 1,
wherein the first subject is included in a first face image selected from the face images responsive to a designation from a user.

3. The apparatus according to claim 1,
wherein the first subject is included in a first face image moved to an important subject area displayed on the display device with the face images responsive to a designation from a user.

4. The apparatus according to claim 1,
wherein the first subject is included in a first face image dragged and dropped onto an important subject area displayed on the display device with the face images responsive to a designation from a user.

5. The apparatus according to claim 1,
wherein the second subject is included in a second face image selected from the face images responsive to a designation from a user.

6. The apparatus according to claim 1,
wherein the second subject is included in a second face image moved to an excluded subject area displayed on the display device with the face images responsive to a designation from a user.

7. The apparatus according to claim 1,
wherein the second subject is included in a second face image dragged and dropped onto an excluded subject area displayed on the display device with the face images responsive to a designation from a user.

8. The apparatus according to claim 1,
wherein the processor creates the electronic album from the selected images among the plurality of images, wherein in the electronic album, a proportion of considered important images considered identical with an important face image which correspond to the important subject is larger than a proportion of images other than the considered important images.

9. The apparatus according to claim 1,
wherein the processor controls the display device to display the electronic album including a plurality of image display frames, each of which sets at least one of the selected images, and
responsive to a designation to a first image display frame of the image display frame from a user, the processor controls the display device to display an image related to the important subject among the plurality of images nearby the first image display frame.

10. The apparatus according to claim 1,
wherein the processor executes the instruction to perform:
setting a theme, and
creating the electronic album from the selected images that match the theme.

11. The apparatus according to claim 5,
wherein the processor executes the instruction to perform:
setting one of persons whose images have been captured, an event where images have been captured, a location where images have been captured, or image-capture date and time as a theme of the electronic album.

12. The apparatus according to claim 1,
wherein the processor executes the instructions to additionally perform:
setting the first subject from the plurality of subjects as a first important subject responsive to a designation from a user,
setting a second subject from the plurality of subjects as a second important subject responsive to a designation from a user,
setting a priority for the first important subject higher than a priority for the second important subject, and
creating an electronic album from selected images among the plurality of images, wherein in the electronic album, a proportion of the selected images including the first important subject is larger than a proportion of the selected images including the second important subject.

13. The apparatus according to claim 1,
wherein the processor executes the instructions to additionally perform controlling the display device to display an important person list including important face images corresponding to the important subject.

14. The apparatus according to claim 13,
wherein, in the important person list, different face images of one person are being displayed.

15. The apparatus according to claim 1,
wherein the processor executes the instructions to perform:
creating an electronic album with a first page image including at least two of the selected images,
controlling the display device to display the first page image, and
responsive to a designation to the first page image from a user, setting important images related to the important subject to the first page image.

16. The apparatus according to claim 1,
wherein, responsive to a designation from the user, the processor is configured to:
set irrelevant images, and
use first images which correspond to an irrelevant subject included in the irrelevant images, second images which correspond to an event related to the irrelevant images, third images which correspond to an irrelevant imaging location related to the irrelevant images, or fourth images which correspond to an imaging date and time related to the irrelevant images, as other images other than important images including the important subject.

17. The apparatus according to claim 1,
wherein the processor further executes the instructions to perform controlling the display device to display the face images in order of frequency of appearance of each of the plurality of subjects.

18. A method of controlling operation of an electronic album apparatus, the method comprising:
extracting face images from a plurality of images;
controlling a display device to display the face images including a plurality of subjects;
setting a first subject from the plurality of subjects as an important subject in response to a designation from a user;
setting a second subject from the plurality of subjects as an excluded subject responsive to a designation from a user;
setting a priority for the important subject higher than a priority for the normal subject other than the important subject among the plurality of subjects;
creating an electronic album from selected images among the plurality of images, wherein in the electronic album, a proportion of images of the important subject from the selected images is larger than a proportion of images including the normal subject from the selected images; and excluding images which correspond to the excluded subject from the selected images used to create the electronic album.

19. A non-transitory recording medium storing a computer-readable program for controlling a computer of an electronic album apparatus to:
- extract face images from a plurality of images;
- control a display device to display the face images including a plurality of subjects;
- set a first subject from the plurality of subjects as an important subject in response to a designation from a user;
- set a second subject from the plurality of subjects as an excluded subject responsive to a designation from a user;
- set a priority for the important subject higher than a priority for the normal subject other than the important subject among the plurality of subjects;
- create an electronic album from selected images among the plurality of images, wherein in the electronic album, a proportion of images including the important subject from the selected images is larger than a proportion of images including the normal subject from the selected images; and
- exclude images which correspond to the excluded subject from the selected images used to create the electronic album.

* * * * *